(12) United States Patent
Liao et al.

(10) Patent No.: US 10,572,070 B2
(45) Date of Patent: Feb. 25, 2020

(54) OPTICAL DEVICES AND FABRICATION METHOD THEREOF

(71) Applicant: Vanguard International Semiconductor Corporation, Hsinchu (TW)

(72) Inventors: Chih-Cherng Liao, Jhudong Township (TW); Shih-Hao Liu, Taoyuan (TW); Wu-Hsi Lu, New Taipei (TW); Ming-Cheng Lo, New Taipei (TW); Chung-Ren Lao, Taichung (TW); Yun-Chou Wei, Taipei (TW); Yin Chen, Hsinchu (TW); Hsin-Hui Lee, Kaohsiung (TW); Hsueh-Jung Lin, Jhubei (TW); Wen-Chih Lu, New Taipei (TW); Ting-Jung Lu, Taoyuan (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/016,869

(22) Filed: Jun. 25, 2018

(65) Prior Publication Data

US 2019/0391701 A1 Dec. 26, 2019

(51) Int. Cl.
*G06F 3/042* (2006.01)
*G06K 9/00* (2006.01)
*G02B 27/30* (2006.01)
*G02B 5/22* (2006.01)

(52) U.S. Cl.
CPC .............. *G06F 3/042* (2013.01); *G02B 5/22* (2013.01); *G02B 27/30* (2013.01); *G06K 9/0004* (2013.01); *G06F 2203/04103* (2013.01); *G06F 2203/04107* (2013.01)

(58) Field of Classification Search
CPC ........ G06F 3/042–0428; G06K 9/0004; G06K 9/00046
See application file for complete search history.

(56) References Cited

U.S. PATENT DOCUMENTS

| | | | | |
|---|---|---|---|---|
| 6,383,578 | B2 * | 5/2002 | Ezzell | C08G 73/10 349/1 |
| 10,296,777 | B2 * | 5/2019 | Du | H01L 27/3262 |
| 10,339,359 | B2 * | 7/2019 | Zhang | G09G 3/3225 |
| 10,361,255 | B2 * | 7/2019 | Zeng | G06K 9/00013 |

(Continued)

FOREIGN PATENT DOCUMENTS

WO WO 2016/074638 A1 5/2016

OTHER PUBLICATIONS

Taiwanese Office Action and Search Report, dated Nov. 26, 2018, for Taiwanese Application No. 107112568.

*Primary Examiner* — Gene W Lee
(74) *Attorney, Agent, or Firm* — Birch, Stewart, Kolasch & Birch, LLP

(57) ABSTRACT

An optical device is provided. The optical device includes a substrate including a plurality of pixel units, a dielectric layer disposed on the substrate, a patterned light-transmitting layer disposed on the dielectric layer and corresponding to the plurality of pixel units, and a plurality of continuous light-shielding layers disposed on the dielectric layer and located on both sides of the patterned light-transmitting layer. A method for fabricating an optical device is also provided.

16 Claims, 8 Drawing Sheets

(56) References Cited

U.S. PATENT DOCUMENTS

| | | | |
|---|---|---|---|
| 2006/0073629 A1 | 4/2006 | Yaung et al. | |
| 2008/0259051 A1* | 10/2008 | Ota | G06F 3/0412 |
| | | | 345/175 |
| 2010/0067757 A1* | 3/2010 | Arai | G06K 9/0004 |
| | | | 382/128 |
| 2010/0144084 A1 | 6/2010 | Doan et al. | |
| 2012/0007988 A1* | 1/2012 | Ikeda | G06F 3/0412 |
| | | | 348/164 |
| 2012/0074406 A1* | 3/2012 | Saitou | G02F 1/13318 |
| | | | 257/53 |
| 2013/0200251 A1 | 8/2013 | Velichko | |
| 2017/0125462 A1 | 5/2017 | Yu et al. | |
| 2018/0005006 A1* | 1/2018 | Chai | G06K 9/0004 |
| 2018/0033835 A1* | 2/2018 | Zeng | G06F 3/0412 |
| 2018/0068157 A1* | 3/2018 | Zeng | G06K 9/0008 |
| 2018/0149898 A1* | 5/2018 | Park | G02F 1/134363 |

\* cited by examiner

OPTICAL DEVICES AND FABRICATION METHOD THEREOF

TECHNICAL FIELD

The technical field relates to an optical device having a collimation effect and a method for fabricating the same.

BACKGROUND

Traditionally, in optical devices used for fingerprint recognition, light-shielding layers are disposed on both sides of a collimator to prevent incident light from leaking into neighboring pixel regions. For example, it is one of the ways to set multi-layered light-shielding layers on both sides of the collimator to try to solve the above-mentioned light leakage problem. The multi-layered light-shielding layer is formed by stacking black light-shielding material layers and transparent material layers on top of each other. Although the light-shielding layer is relatively simple to fabricate, since the black light-shielding material layers and the transparent material layers are stacked on top of each other, it is still possible for light entering the collimator to leak from the transparent material layers on both sides of the collimator into neighboring pixel regions by means of refraction or diffraction, which can cause further interference with the light reception of the neighboring pixel regions. From this point of view, this design does not really solve the problem of cross-talk interference.

Therefore, development of an optical device having an optimal collimation effect and capable of avoiding cross-talk, and a related fabrication method thereof, is desirable.

SUMMARY

In accordance with one embodiment of the invention, an optical device is provided. The optical device comprises a substrate, a dielectric layer, a patterned light-transmitting layer, and a plurality of continuous light-shielding layers. The substrate comprises a plurality of pixel units. The dielectric layer is disposed on the substrate. The patterned light-transmitting layer is disposed on the dielectric layer and corresponds to the plurality of pixel units. In addition, the continuous light-shielding layers are disposed on the dielectric layer and located on both sides of the patterned light-transmitting layer.

In accordance with some embodiments, the patterned light-transmitting layer comprises organic materials having a transparency which is more than 90%.

In accordance with some embodiments, the patterned light-transmitting layer allows transmission of light having a wavelength which is greater than 550 nm.

In accordance with some embodiments, the ratio of thickness to width of the patterned light-transmitting layer is in a range from 5:1 to 15:1.

In accordance with some embodiments, the ratio of width of the patterned light-transmitting layer to width of the pixel unit is in a range from 0.5:1 to 0.75:1.

In accordance with some embodiments, the plurality of light-shielding layers are continuous in a longitudinal direction.

In accordance with some embodiments, the light-shielding layer comprises an oxide layer and a light-shielding material layer which surrounds the oxide layer.

In accordance with some embodiments, the light-shielding material layer comprises titanium nitride (TiN), titanium tungsten (TiW) alloy or tungsten (W).

In accordance with some embodiments, the light-shielding material layer has a thickness which is in a range from 300 Å to 1,500 Å.

In accordance with some embodiments, the optical device further comprises a touch glass which is disposed on the patterned light-transmitting layer and the plurality of continuous light-shielding layers.

In accordance with one embodiment of the invention, a method for fabricating an optical device is provided. The fabrication method comprises the following steps. A substrate is provided. The substrate comprises a plurality of pixel units. A dielectric layer is formed on the substrate. A patterned light-transmitting layer is formed on the dielectric layer. The patterned light-transmitting layer corresponds to the plurality of pixel units. A light-shielding material layer is conformally formed on the patterned light-transmitting layer and the dielectric layer. Specifically, an oxide layer is formed on the light-shielding material layer to form a plurality of continuous light-shielding layers. The continuous light-shielding layers are located on both sides of the patterned light-transmitting layer.

In accordance with some embodiments, the light-shielding material layer is conformally formed on the patterned light-transmitting layer and the dielectric layer by performing chemical vapor deposition (CVD), physical vapor deposition (PVD) or sputtering.

In accordance with some embodiments, a barrier layer is further conformally formed on the patterned light-transmitting layer and the dielectric layer before the light-shielding material layer is formed.

In accordance with some embodiments, an etch-back process or a chemical mechanical polishing (CMP) process is further performed to form the plurality of continuous light-shielding layers located on both sides of the patterned light-transmitting layer after the oxide layer is formed.

In the present invention, the light-shielding layers disposed on both sides of the light-transmitting layer (i.e. a collimator) are continuous in a longitudinal direction, that is, the light-shielding layers extend along the direction vertical to the substrate to form continuous patterns. There is no gap that allows light to penetrate the light-shielding layer. Thus, when light enters the light-transmitting layer, the incident light does not leak from the light-shielding layers located on both sides of the light-transmitting layer into neighboring pixel units. In this way, incident light from a variety of angles can be more concentrated into the corresponding pixel units, effectively reducing cross-talk between neighboring pixels. In addition, both the ratio (for example, from 5:1 to 15:1) of thickness to width of the light-transmitting layer and the ratio (for example, from 0.5:1 to 0.75:1) of width of the light-transmitting layer to width of the pixel unit defined by the present invention are specific and appropriate ratio ranges. These specific size ratios in the device structure not only maintain the light collimation effect, but they also ensure the light signal reaches the bottom (which connects the pixel units) of the light-transmitting layer at an appropriate intensity, really maintaining the light receiving effect of the pixel units. Furthermore, the present invention adopts staged process steps to gradually increase the thickness of the light-transmitting layer. This method can prevent the over-thickness of the light-transmitting layer (which is made in a one-time process) from causing the light-transmitting layer structure to be dumped in subsequent processes (such as various deposition methods and chemical mechanical polishing (CMP)).

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
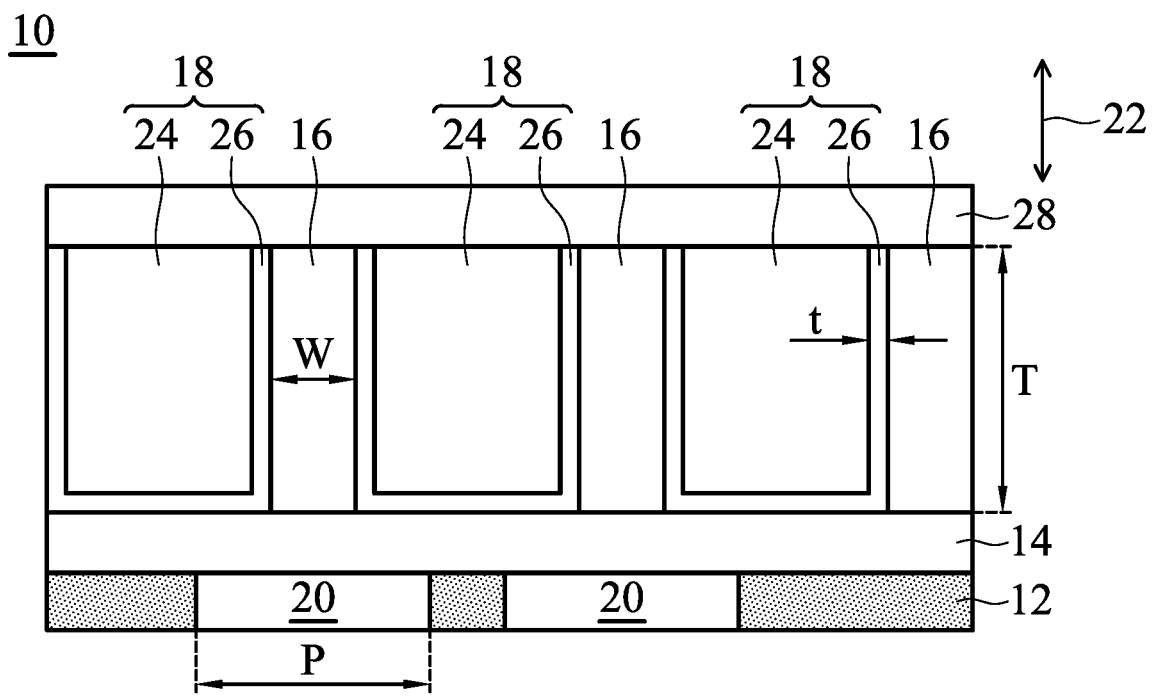
FIG. 1 is a cross-sectional view of an optical device in accordance with one embodiment of the invention.

Referring to FIG. 1, in accordance with one embodiment of the invention, an optical device 10 is provided. FIG. 1 is a cross-sectional view of the optical device 10 in this embodiment.

As shown in FIG. 1, in this embodiment, the optical device 10 comprises a substrate 12, a dielectric layer 14, a patterned light-transmitting layer 16, and a plurality of continuous light-shielding layers 18. The substrate 12 comprises a plurality of pixel units 20. The dielectric layer 14 is disposed on the substrate 12. The patterned light-transmitting layer 16 is disposed on the dielectric layer 14. The patterned light-transmitting layer 16 corresponds to the plurality of pixel units 20. The plurality of continuous light-shielding layers 18 are disposed on the dielectric layer 14 and located on both sides of the patterned light-transmitting layer 16.

In accordance with some embodiments, the substrate 12 may comprise a silicon substrate or any suitable substrate material.

In accordance with some embodiments, the dielectric layer 14 may comprise oxide, nitride, oxynitride or any suitable dielectric material.

In accordance with some embodiments, the patterned light-transmitting layer 16 may comprise organic materials having a transparency which is more than about 90%, for example, epoxy resin or similar photoresist materials having a transparency which is more than about 90%.

In accordance with some embodiments, the patterned light-transmitting layer 16 may allow transmission of light having a wavelength which is greater than about 550 nm, for example, allowing transmission of green light or other visible light or non-visible light within this wavelength range.

In accordance with some embodiments, the ratio of thickness "T" to width "W" of the patterned light-transmitting layer 16 may be in a range from about 5:1 to about 15:1.

In accordance with some embodiments, the ratio of thickness "T" to width "W" of the patterned light-transmitting layer 16 may be about 10:1.

In accordance with some embodiments, the ratio of width "W" of the patterned light-transmitting layer 16 to width "P" of the pixel unit 20 may be in a range from about 0.5:1 to about 0.75:1.

In accordance with some embodiments, the ratio of width "W" of the patterned light-transmitting layer 16 to width "P" of the pixel unit 20 may be about 0.5:1.

In accordance with some embodiments, the plurality of light-shielding layers 18 may be continuous in a longitudinal direction. The longitudinal direction here refers to the direction 22 vertical to the substrate 12, i.e., the light-shielding layer 18 extends along the direction 22 to form a continuous pattern.

In accordance with some embodiments, the light-shielding layer 18 may comprise an oxide layer 24 and a light-shielding material layer 26 which surrounds the oxide layer 24.

In accordance with some embodiments, the oxide layer 24 may comprise a high-density plasma (HDP) oxide layer or a spin-on-glass (SOG) oxide layer.

In accordance with some embodiments, the light-shielding material layer 26 may comprise titanium nitride (TiN), titanium tungsten (TiW) alloy, tungsten (W) or other light-shielding metal materials.

In accordance with some embodiments, the thickness "t" of the light-shielding material layer 26 may be in a range from about 300 Å to about 1,500 Å.

In accordance with some embodiments, a barrier layer (not shown) may be further disposed between the light-shielding material layer 26 and the patterned light-transmitting layer 16 to promote the adhesion between the light-shielding material layer 26 and the patterned light-transmitting layer 16.

In accordance with some embodiments, the barrier layer may comprise an oxide layer.

In accordance with some embodiments, the thickness of the barrier layer may be in a range from about 800 Å to about 1,000 Å.

In accordance with some embodiments, the optical device 10 further comprises a touch glass 28 which is disposed on the patterned light-transmitting layer 16 and the plurality of continuous light-shielding layers 18.

The optical device 10 of the present invention can be widely applied in the field of optical identification, such as fingerprint recognition.

Referring to FIGS. 2A-2E, in accordance with one embodiment of the invention, a method for fabricating an optical device is provided. FIGS. 2A-2E are cross-sectional views of the method for fabricating the optical device in this embodiment.

Figure 2A:
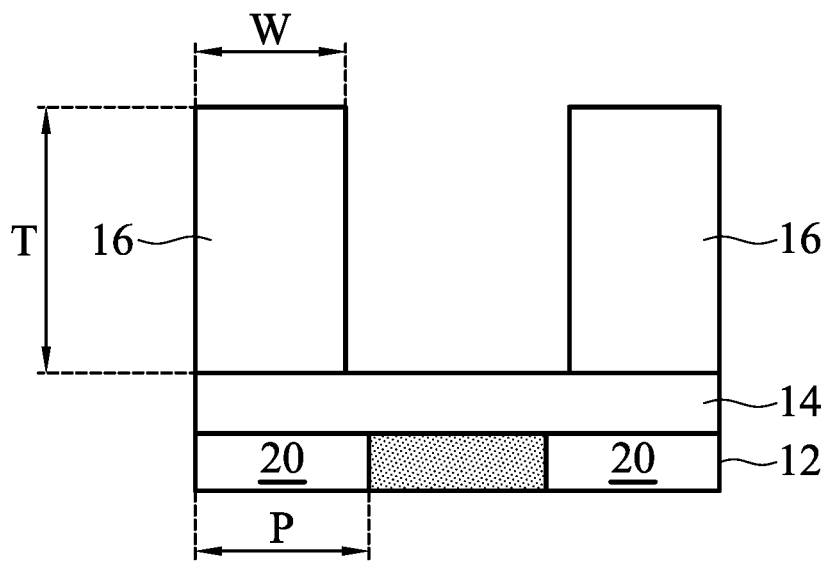
FIGS. 2A-2E are cross-sectional views of a method for fabricating an optical device in accordance with one embodiment of the invention.

As shown in FIG. 2A, a substrate 12 is provided. The substrate 12 comprises a plurality of pixel units 20.

In accordance with some embodiments, the substrate 12 may comprise a silicon substrate or any suitable substrate material.

Next, a dielectric layer 14 is formed on the substrate 12.

In accordance with some embodiments, the dielectric layer 14 may comprise oxide, nitride, oxynitride or any suitable dielectric material.

Next, a light-transmitting layer (not shown) is formed on the dielectric layer 14. A patterned photoresist layer (not shown) is then formed on the light-transmitting layer. A lithography process is then performed using the patterned photoresist layer as a mask to form a patterned light-transmitting layer 16.

Specifically, the patterned light-transmitting layer 16 corresponds to the plurality of pixel units 20.

In accordance with some embodiments, the patterned light-transmitting layer 16 may comprise organic materials having a transparency which is more than about 90%, for example, epoxy resin or similar photoresist materials having a transparency which is more than about 90%.

In accordance with some embodiments, the patterned light-transmitting layer 16 may allow transmission of light having a wavelength which is greater than about 550 nm, for example, allowing transmission of green light or other visible light or non-visible light within this wavelength range.

In accordance with some embodiments, the ratio of thickness "T" to width "W" of the patterned light-transmitting layer 16 may be in a range from about 5:1 to about 15:1.

In accordance with some embodiments, the ratio of thickness "T" to width "W" of the patterned light-transmitting layer 16 may be about 10:1.

In accordance with some embodiments, the ratio of width "W" of the patterned light-transmitting layer 16 to width "P" of the pixel unit 20 may be in a range from about 0.5:1 to about 0.75:1.

In accordance with some embodiments, the ratio of width "W" of the patterned light-transmitting layer 16 to width "P" of the pixel unit 20 may be about 0.5:1.

Figure 2B:
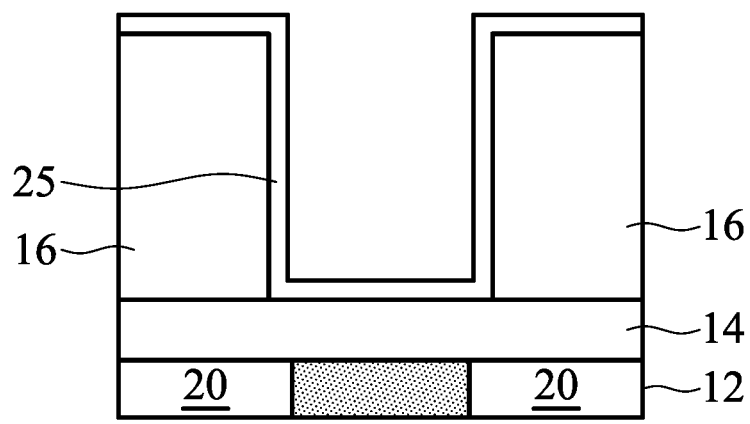

Next, as shown in FIG. 2B, a barrier layer 25 is conformally formed on the patterned light-transmitting layer 16 and the dielectric layer 14 exposed from the patterned light-transmitting layer 16 by any suitable deposition method.

In accordance with some embodiments, the barrier layer 25 may comprise an oxide layer.

In accordance with some embodiments, the thickness of the barrier layer 25 may be in a range from about 800 Å to about 1,000 Å.

Figure 2C:
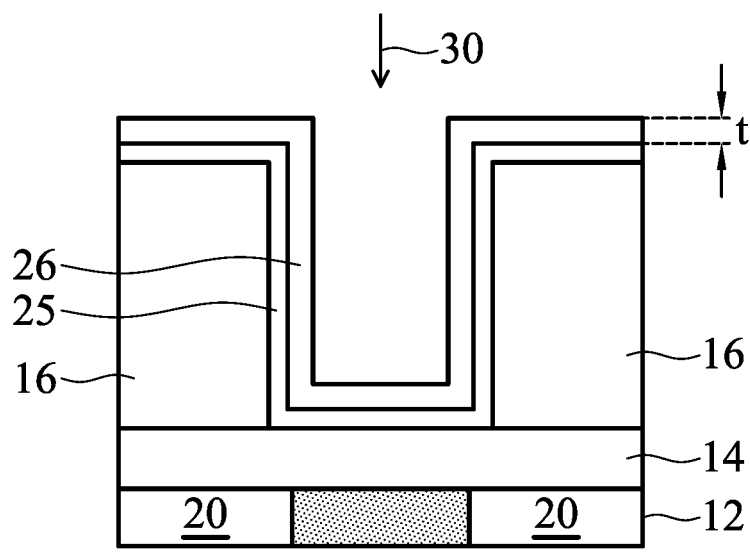

Next, as shown in FIG. 2C, a light-shielding material layer 26 is conformally formed on the barrier layer 25 by, for example, chemical vapor deposition (CVD), physical vapor deposition (PVD) or sputtering.

In accordance with some embodiments, the light-shielding material layer 26 may comprise titanium nitride (TiN), titanium tungsten (TiW) alloy, tungsten (W) or another light-shielding metal material.

In accordance with some embodiments, the thickness "t" of the light-shielding material layer 26 may be in a range from about 300 Å to about 1,500 Å.

Figure 2D:
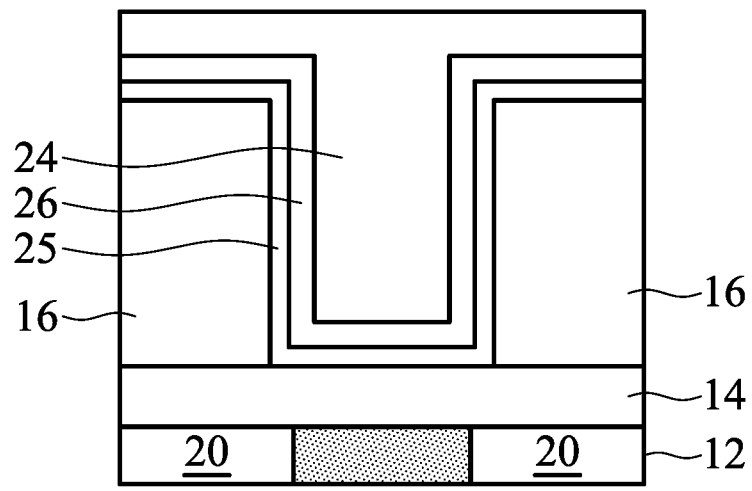

Next, an oxide layer 24 is formed on the light-shielding material layer 26 and filled into the region 30 within the patterned light-transmitting layer 16 by performing, for example, a high-density plasma (HDP) process or a spin-on-glass (SOG) process, as shown in FIG. 2D.

Figure 2E:
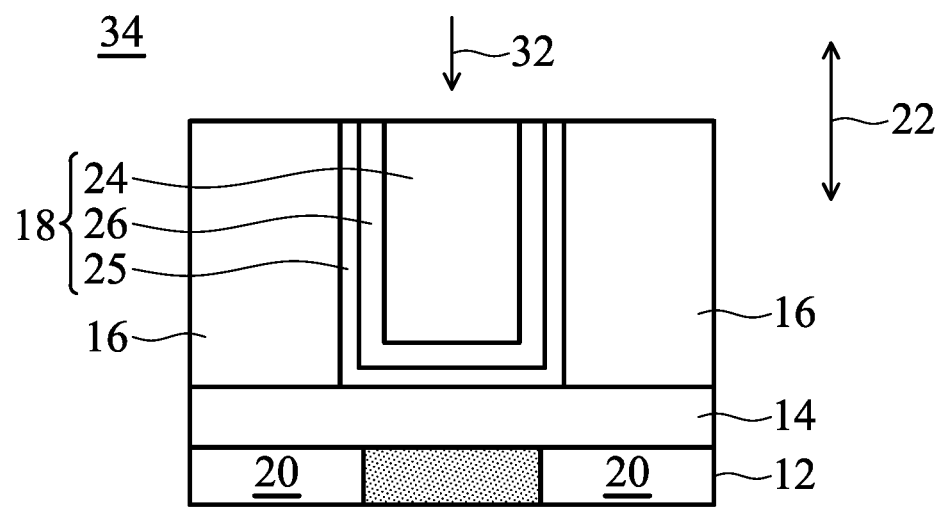

Next, as shown in FIG. 2E, a planarizing step 32 is performed using, for example, an etch-back process or a chemical mechanical polishing (CMP) process to form a plurality of continuous light-shielding layers 18 located on both sides of the patterned light-transmitting layer 16. Therefore, an optical structure 34 of this embodiment is fabricated.

In accordance with some embodiments, the plurality of light-shielding layers 18 may be continuous in a longitudinal direction. The longitudinal direction here refers to the direction 22 vertical to the substrate 12, i.e., the light-shielding layer 18 extends along the direction 22 to form a continuous pattern.

In accordance with some embodiments, a touch glass (not shown) is further disposed on the patterned light-transmitting layer 16 and the plurality of continuous light-shielding layers 18.

Referring to FIGS. 3A-3E, in accordance with one embodiment of the invention, a method for fabricating an optical device is provided. FIGS. 3A-3E are cross-sectional views of the method for fabricating the optical device in this embodiment.

Figure 3A:
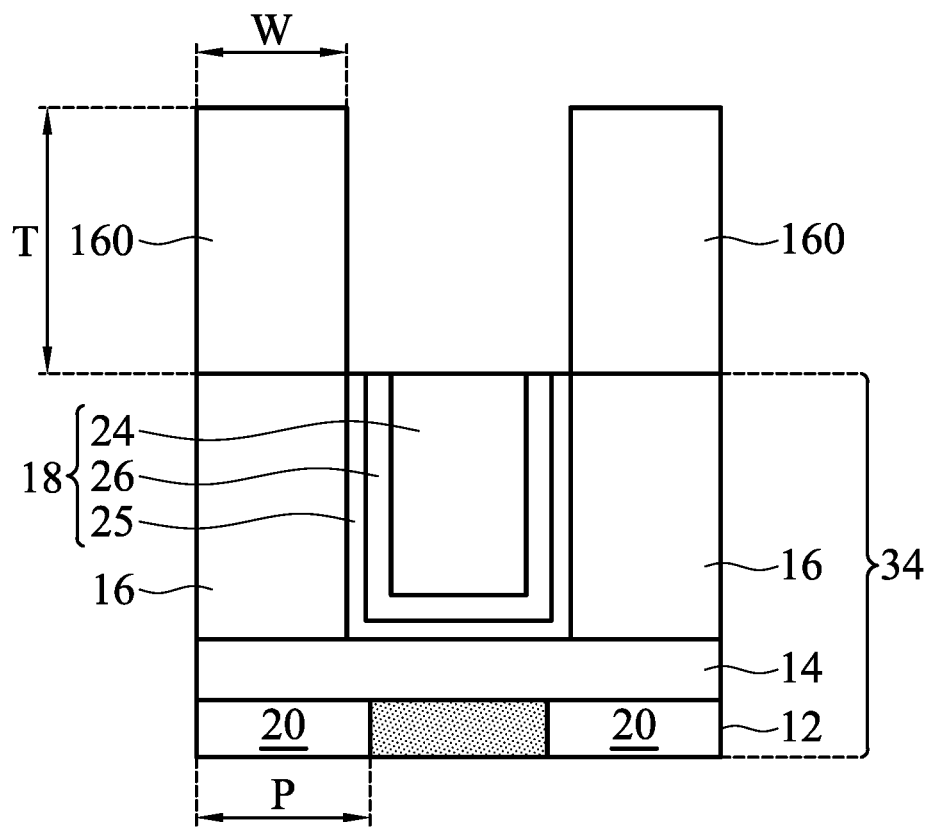
FIGS. 3A-3E are cross-sectional views of a method for fabricating an optical device in accordance with one embodiment of the invention.

First, as shown in FIG. 3A, the optical structure 34 as shown in FIG. 2E is provided.

Next, a light-transmitting layer (not shown) is formed on the optical structure 34. A patterned photoresist layer (not shown) is then formed on the light-transmitting layer. A lithography process is then performed using the patterned photoresist layer as a mask to form a patterned light-transmitting layer 160.

Specifically, the patterned light-transmitting layer 160 corresponds to the patterned light-transmitting layer 16 and the plurality of pixel units 20.

In accordance with some embodiments, the patterned light-transmitting layer 160 may comprise organic materials having a transparency which is more than about 90%, for example, epoxy resin or similar photoresist materials having a transparency which is more than about 90%.

In accordance with some embodiments, the patterned light-transmitting layer 160 may allow transmission of light having a wavelength which is greater than about 550 nm, for example, allowing transmission of green light or other visible light or non-visible light within this wavelength range.

In accordance with some embodiments, the ratio of thickness "T" to width "W" of the patterned light-transmitting layer 160 may be in a range from about 5:1 to about 15:1.

In accordance with some embodiments, the ratio of thickness "T" to width "W" of the patterned light-transmitting layer 160 may be about 10:1.

In accordance with some embodiments, the ratio of width "W" of the patterned light-transmitting layer 160 to width "P" of the pixel unit 20 may be in a range from about 0.5:1 to about 0.75:1.

In accordance with some embodiments, the ratio of width "W" of the patterned light-transmitting layer 160 to width "P" of the pixel unit 20 may be about 0.5:1.

Figure 3B:
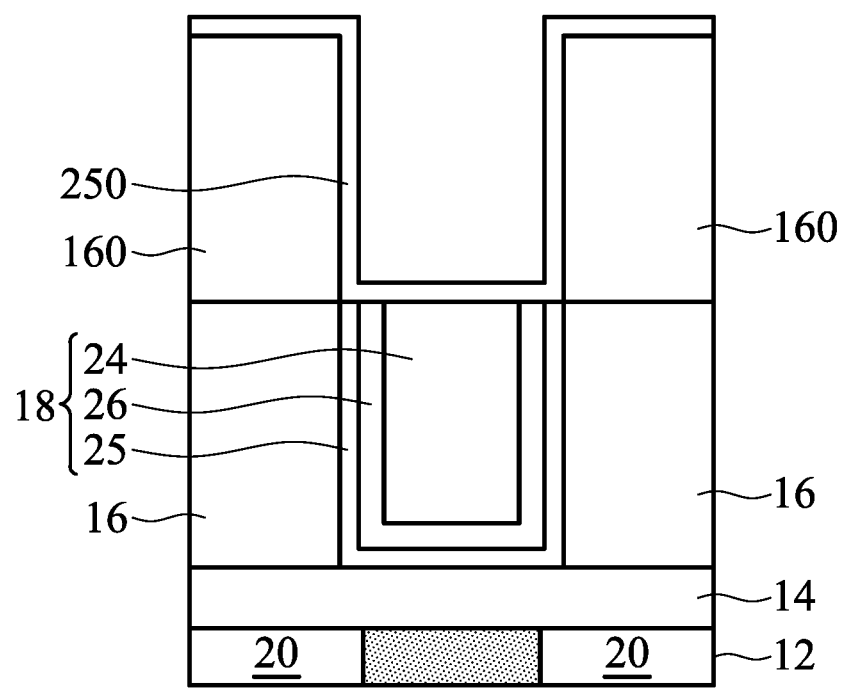

Next, as shown in FIG. 3B, a barrier layer 250 is conformally formed on the patterned light-transmitting layer 160 and the light-shielding layer 18 exposed from the patterned light-transmitting layer 160 by any suitable deposition method.

In accordance with some embodiments, the barrier layer 250 may comprise an oxide layer.

In accordance with some embodiments, the thickness of the barrier layer 250 may be in a range from about 800 Å to about 1,000 Å.

Figure 3C:
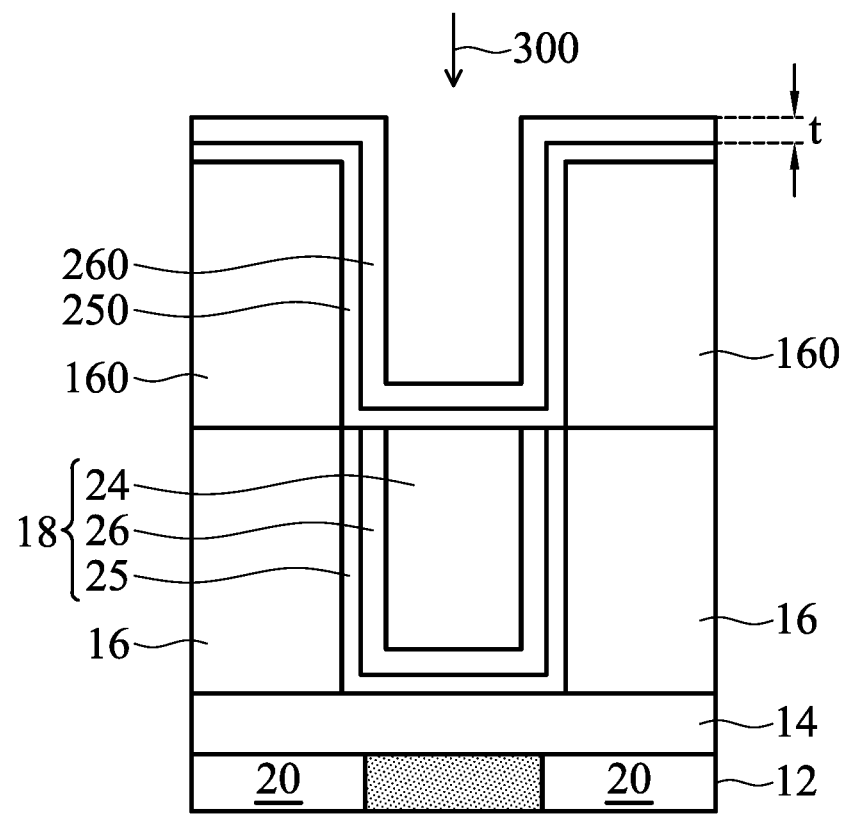

Next, as shown in FIG. 3C, a light-shielding material layer 260 is conformally formed on the barrier layer 250 by, for example, chemical vapor deposition (CVD), physical vapor deposition (PVD) or sputtering.

In accordance with some embodiments, the light-shielding material layer 260 may comprise titanium nitride (TiN), titanium tungsten (TiW) alloy, tungsten (W) or other light-shielding metal materials.

In accordance with some embodiments, the thickness "t" of the light-shielding material layer 260 may be in a range from about 300 Å to about 1,500 Å.

Figure 3D:
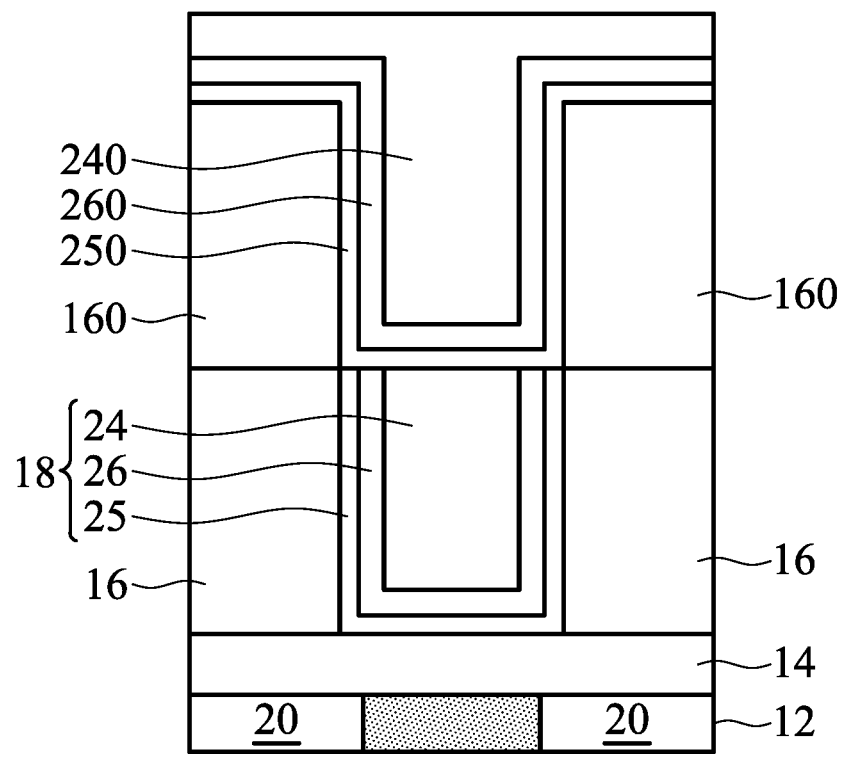

Next, an oxide layer 240 is formed on the light-shielding material layer 260 and filled into the region 300 within the patterned light-transmitting layer 160 by performing, for example, a high-density plasma (HDP) process or a spin-on-glass (SOG) process, as shown in FIG. 3D.

Figure 3E:
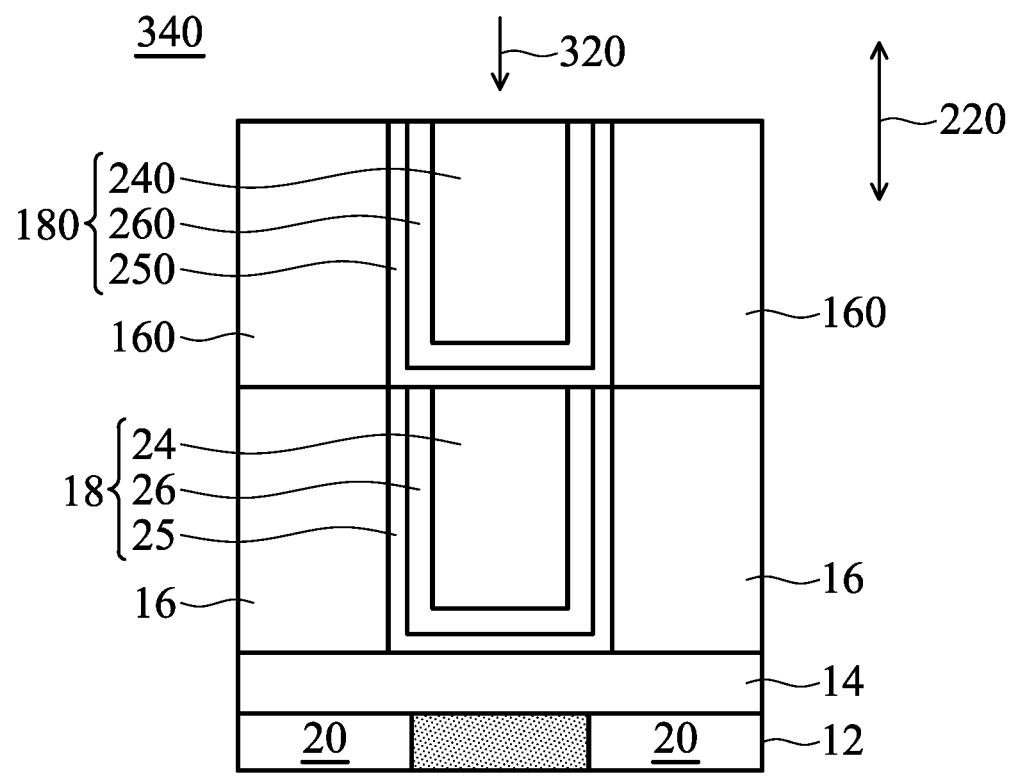

Next, as shown in FIG. 3E, a planarizing step 320 is performed using, for example, an etch-back process or a chemical mechanical polishing (CMP) process to form a plurality of continuous light-shielding layers 180 located on both sides of the patterned light-transmitting layer 160. Therefore, an optical structure 340 of this embodiment is fabricated.

In accordance with some embodiments, the plurality of light-shielding layers 180 may be continuous in a longitudinal direction. The longitudinal direction here refers to the direction 220 vertical to the substrate 12, i.e., the light-shielding layer 180 extends along the direction 220 to form a continuous pattern.

In accordance with some embodiments, a touch glass (not shown) is further disposed on the patterned light-transmitting layer 160 and the plurality of continuous light-shielding layers 180.

In the present invention, the thickness of the optical device, that is, the thickness of the light-transmitting layer (a collimator) can be adjusted by repeating the above-mentioned process steps.

In the present invention, the light-shielding layers disposed on both sides of the light-transmitting layer (i.e. a collimator) are continuous in a longitudinal direction, that is, the light-shielding layers extend along the direction vertical to the substrate to form continuous patterns. There is no gap that allows light to penetrate the light-shielding layer. Thus, when light enters the light-transmitting layer, the incident light does not leak from the light-shielding layers located on both sides of the light-transmitting layer into neighboring pixel units. In this way, incident light from a variety of angles can be more concentrated into the corresponding pixel units, effectively reducing cross-talk between neighboring pixels. In addition, both the ratio (for example, from 5:1 to 15:1) of thickness to width of the light-transmitting layer and the ratio (for example, from 0.5:1 to 0.75:1) of width of the light-transmitting layer to width of the pixel unit defined by the present invention are specific and appropriate ratio ranges. These specific size ratios in the device structure not only maintain the light collimation effect, but they also ensure the light signal reaches the bottom (which connects the pixel units) of the light-transmitting layer at an appropriate intensity, really maintaining the light receiving effect of the pixel units. Furthermore, the present invention adopts staged process steps to gradually increase the thickness of the light-transmitting layer. This method can prevent the over-thickness of the light-transmitting layer (which is made in a one-time process) from causing the light-transmitting layer structure to be dumped in subsequent processes (such as various deposition methods and chemical mechanical polishing (CMP)).

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
a substrate comprising a plurality of pixel unit;
a dielectric layer disposed on the substrate;
a patterned light-transmitting layer having a plurality of portions disposed on the dielectric layer, wherein the patterned light-transmitting layer corresponds to the plurality of pixel units, wherein a ratio of thickness to width of each portion of the patterned light-transmitting layer is in a range from 5:1 to 15:1; and
a plurality of continuous light-shielding layers disposed on the dielectric layer, wherein the continuous light-shielding layers are located on opposite lateral sides of each portion of the patterned light-transmitting layer, wherein a ratio of width of each portion of the patterned light-transmitting layer to width of the pixel unit is in a range from 0.5:1 to 0.75:1.

2. The optical device as claimed in claim 1, wherein the patterned light-transmitting layer comprises organic materials having a transparency which is more than 90%.

3. The optical device as claimed in claim 1, wherein the patterned light-transmitting layer allows transmission of light having a wavelength which is greater than 550 nm.

4. The optical device as claimed in claim 1, wherein the plurality of light-shielding layers are continuous in a longitudinal direction.

5. The optical device as claimed in claim 1, wherein the light-shielding layer comprises a light-shielding material layer and an oxide layer formed on the light-shielding material layer.

6. The optical device as claimed in claim 5, wherein the light-shielding material layer comprises titanium nitride (TiN), titanium tungsten (TiW) alloy or tungsten (W).

7. The optical device as claimed in claim 5, wherein the light-shielding material layer has a thickness which is in a range from 300 Å to 1,500 Å.

8. The optical device as claimed in claim 1, further comprising a touch glass disposed on the patterned light-transmitting layer and the plurality of continuous light-shielding layers.

9. A method for fabricating an optical device, comprising:
providing a substrate comprising a plurality of pixel units;
forming a dielectric layer on the substrate;
forming a patterned light-transmitting layer having a plurality of portions on the dielectric layer, wherein the patterned light-transmitting layer corresponds to the plurality of pixel units, wherein a ratio of thickness to width of each portion of the patterned light-transmitting layer is in a range from 5:1 to 15:1;
formally forming a light-shielding material layer on the patterned light-transmitting layer and the dielectric layer; and
forming an oxide layer on the light-shielding material layer to form a plurality of continuous light-shielding layers, wherein the continuous light-shielding layers are located on opposite lateral sides of each portion of the patterned light-transmitting layer, wherein a ratio of width of each portion of the patterned light-transmitting layer to width of the pixel unit is in a range from 0.5:1 to 0.75:1.

10. The method for fabricating an optical device as claimed in claim 9, wherein the patterned light-transmitting layer comprises organic materials having a transparency which is more than 90% and allows transmission of light having a wavelength which is greater than 550 nm.

11. The method for fabricating an optical device as claimed in claim 9, wherein the light-shielding material layer is conformally formed on the patterned light-transmitting layer and the dielectric layer by chemical vapor deposition (CVD), physical vapor deposition (PVD) or sputtering.

12. The method for fabricating an optical device as claimed in claim 9, wherein the light-shielding material layer comprises titanium nitride (TiN), titanium tungsten (TiW) alloy or tungsten (W).

13. The method for fabricating an optical device as claimed in claim 9, wherein the light-shielding material layer has a thickness which is in a range from 300 Å to 1,500 Å.

14. The method for fabricating an optical device as claimed in claim 9, further comprising conformally forming a barrier layer on the patterned light-transmitting layer and the dielectric layer before the light-shielding material layer is formed.

15. The method for fabricating an optical device as claimed in claim 9, further comprising performing an etch-back process or a chemical mechanical polishing (CMP) process to form the plurality of continuous light-shielding layers located on both sides of the patterned light-transmitting layer after the oxide layer is formed.

16. The method for fabricating an optical device as claimed in claim 9, wherein the plurality of light-shielding layers are continuous in a longitudinal direction.

\* \* \* \* \*